United States Patent [19]

Flanagan et al.

[11] Patent Number: 5,715,466
[45] Date of Patent: Feb. 3, 1998

[54] SYSTEM FOR PARALLEL FOREIGN LANGUAGE COMMUNICATION OVER A COMPUTER NETWORK

[75] Inventors: Mary A. Flanagan, Framingham, Mass.; Alexander B. Trevor, Worthington, Ohio; Philip Jensen, Roslindale, Mass.

[73] Assignee: CompuServe Incorporated, Columbus, Ohio

[21] Appl. No.: 474,491

[22] Filed: Jun. 7, 1995

Related U.S. Application Data

[63] Continuation of Ser. No. 388,630, Feb. 14, 1995, abandoned.
[51] Int. Cl.⁶ .................................................... G06F 17/28
[52] U.S. Cl. ..................... 395/755; 395/752; 395/753; 395/758; 395/798
[58] Field of Search ..................... 364/419.01, 419.02, 364/419.03, 419.04, 419.05, 419.06, 419.07, 419.08, 419.16, 419.17; 395/752, 753, 754, 755, 757, 758, 759, 793, 798, 802, 803

[56] References Cited

U.S. PATENT DOCUMENTS

| 4,962,452 | 10/1990 | Nogami et al. | 395/755 |
|---|---|---|---|
| 5,005,127 | 4/1991 | Kugimiya et al. | 364/419.05 |
| 5,270,928 | 12/1993 | Suzuki et al. | 364/419.05 |
| 5,373,442 | 12/1994 | Kutsumi et al. | 364/419.05 |

*Primary Examiner*—Jeffery Hofsass
*Assistant Examiner*—Andrew Hill
*Attorney, Agent, or Firm*—Standley & Gilcrest

[57] ABSTRACT

A system is disclosed which allows for an electronic discussion group user to communicate with another user who speaks a different language. Machine translators and other software are incorporated to translate messages, thereby creating parallel discussion groups in different languages.

2 Claims, 14 Drawing Sheets

MACHINE TRANSLATION SOFTWARE COMPONENT PROCESS FLOW

TRILINGUAL MACHINE TRANSLATION

A. ORIGINAL MESSAGE
B. FRENCH TO ENGLISH TRANSLATION
C. GERMAN TO ENGLISH TRANSLATION
D. ENGLISH TO FRENCH TRANSLATION
E. ENGLISH TO GERMAN TRANSLATION

ENGLISH DISCUSSION GROUP 42

HI DAVE.
WHEN WILL THE NEW VERSION BE AVAILABLE?

I WOULD WANT TO ORDER THE NEW VERSION ALSO. JEAN

I READ RECENTLY THAT THE NEW VERSION...WILL BE FINISHED IN SIX MONTHS.

FRENCH DISCUSSION GROUP

BONJOUR DAVE. QUAND EST CE QUE LA NOUVELLE VERSION SERA DESPONIBLE?

JE VOUDRAIS COMMANDER LA NOUVELLE VERSION AUSSI. JEAN

I READ RECENTLY THAT THE NEWEST VERSION...WILL BE FINISHED IN SIX MONTHS.

44

GERMAN DISCUSSION GROUP

GUTENTAG DAVE.
WANN WIRD DIE NEUE VERSION ZUR VERFÜGUNG LEBES?

ICH HABE KÜRZLICH GELESEN DAB DIE NEUSTE VERSION IN DER...FERTIG SEIN WIRD.

I WOULD WANT TO ORDER THE NEW VERSION ALSO.
JEAN

| TITLE | SINCE 11/16/94 12:04 AM TOPICS | MSGS |
|---|---|---|
| ☐ GENERAL QUESTIONS | 202 | 405 |
| ☐ COMMON SOLUTIONS | 4 | 4 |
| ☐ INSTALL/UPGRADE | 43 | 108 |
| ☐ MODEMS/HARDWARE | 39 | 80 |
| ☐ FORUMS | 17 | 31 |
| ☐ MAIL | 46 | 88 |
| ☐ FILING CABINET | 15 | 43 |
| ☐ PRINTING | 2 | 3 |
| ☐ ONLINE SERVICES | 14 | 28 |
| ☐ TERMINAL EMULATION | 3 | 4 |
| ☒ MT COMMENTS | 2 | 2 |
| ☐ SUGGESTIONS | 6 | 11 |

SELECT   MARK   ALL   CLOSE

SYSTEM FOR PARALLEL FOREIGN LANGUAGE COMMUNICATION OVER A COMPUTER NETWORK

BACKGROUND AND SUMMARY OF THE INVENTION

The present application is a continuation of application for U.S. patent application Ser. No. 08/388,630, abandoned, by Mary A, Flanagan, Alexander B. Trevor and Phillip Jensen, filed Feb. 14, 1995, entitled "System for Parallel Foreign Language Communication over a Computer Network", which is incorporated herein by reference.

The present invention relates generally to the technical field of electronic communication over a computer network and, more particularly, the present invention relates to multi-lingual electronic communication in the form of parallel electronic discussion groups.

In the field of the present invention there are basically two types of electronic network communication in use today: electronic mail and bulletin board systems. Electronic mail is a way of sending messages to another computer user (possibly located at a remote site) through the use of a modem. Electronic mail is generally used to send messages to other computer users about any subject. A bulletin board system (BBS) may be run from a computer that uses a special program to allow other computers to call it, by use of a modem, ordinarily over standard telephone lines. A BBS acts as a storage facility, where people calling from their computers can post or receive messages and send or receive program files. A BBS is usually subdivided by topics so that users with similar interests can send information to other users of similar interests. These related groups of messages are referred to as topics, message areas, Forum® (a registered trademark of CompuServe Incorporated) or conferences (i.e. a particular BBS may contain numerous related groups of messages such as on the subjects of travel, sports, stamp collecting, etc.).

BBSs are distinguishable from electronic mail in that BBSs are used for posting messages of a particular group of computer users who have similar interests but these posted messages are not ordinarily addressed to any particular user. BBSs are also used by some computer users who wish to just read posted messages and other information, without having to post a reply message. For example, a person in Columbus, Ohio, who is preparing for a vacation, may access a BBS on travel, through his home computer, and post a message asking for the best places to go skiing in the United States. Other network users with an interest in travel may read the message from the person from Columbus, and then reply with their opinion about where the best place is for skiing. There are thousands of BBSs available to computer network users on a wide variety of subject areas.

As the number of computer networks being accessed by international users increases, the number of online discussion groups for users with similar interests, from different countries, also increases. For example, a person in France may access a discussion group on international law, to obtain information about trade laws. Assuming that the French person is only familiar with the French language, the French person cannot send a message that would be understood by a German speaking user or an English speaking user. Thus, the need arises for an electronic discussion group which can be utilized by foreign language speaking users.

Language translation software is currently available, however, to Applicants' knowledge, it has only been used for purposes of electronic mail, in online services environments, where the identity and language of the person receiving the message is known. For example, if a French person wants to send a message to Bob Smith, who is American, the French person can send the message through a French to English machine translator on the network. However, there is currently no successful implementation of language translation software in an environment such as an electronic public discussion group which may have an unknown group of users of different languages. For example, if a French speaking person wants to access a travel discussion group, run from a BBS in New York, and inquire into the best places for mountain climbing in the world; currently, the French person can translate his message to the discussion group in only one other language (e.g. English). Thus, only people who can read English or French would understand and be able to reply to the message. A person in Japan, who does not have command of the English language and has valuable information relating to mountain climbing in Japan, will not understand the message posted in English and will not be able to respond to the inquiry. Additionally, if the French person cannot read English, he will not understand replies posted to the discussion group in English.

The present invention may be used in a system of parallel discussion groups operated in conjunction with a message collection/posting software program and a machine translation software program. The present invention may be used for a number of discussion groups running in "parallel"; one group for each language being used in the discussion groups. The individual discussion groups all contain the same information, in the same order; the only difference being that each parallel discussion group is written in a different language.

Once a user logs onto a particular parallel discussion group he or she may then choose his or her language preference. If the user's language preference is set to French, the French version of the discussion group will be accessed. Messages posted to a discussion group will be periodically collected, translated to the other languages, and then posted to those respective target language discussion groups. The collection and posting of the messages will be accomplished by the Message Collection/Posting Software. The new messages which are collected on a periodic basis may be sent to a commercially available Machine Translation (MT) software for translation.

Before the input text is actually submitted to the MT software, the input text is passed through the present invention which is a filter software program that preprocesses the data before it is submitted to the MT software. The filter identifies and marks strings which are best left untranslated by the MT software; such as personal names, company product names, file and path names, commands, samples of source code, and the like. By marking these strings, the filter notifies the MT software to leave those strings untranslated. These strings are then linked to a preceding "hookword". Hookwords are automatically inserted then deleted in post-processing and are contained in dictionaries with a part-of-speech and other grammatical features to affect rearrangement of the word in the target language. Once the translation process is complete, the translations are collected and posted, by the Message Collection/Posting Software, to the target language discussion groups at the same location within the message structure as the original version of the message.

Thus, some of the messages on a French version of a discussion group will have been originally written in French whereas many will be translations of messages which were originally written in English. Each of the messages translated from another language version of the parallel discussion group may contain both the translated message and the original language text. For example, a message originally written in the English version of the discussion group and translated to the French version may be shown on screen with the original English text in addition to the French translation.

The primary object of the invention is to create a structure and process to enable discussion group users, of different languages, to communicate with one another. Further objects and advantages of this invention will become apparent when viewed in light of the following drawings and detailed description.

BRIEF DESCRIPTION OF THE DRAWINGS

FIG. 2 is a diagrammatic view of multiple languages in communication over parallel discussion groups which may utilize the present invention;

FIG. 7 is an example of a screen display of a user accessing a parallel discussion group via point and click;

FIG. 9 is an example of a screen display for a user creating an original message to be posted on a parallel foreign language discussion group;

DETAILED DESCRIPTION OF PREFERRED EMBODIMENT(S)

Figure 1:
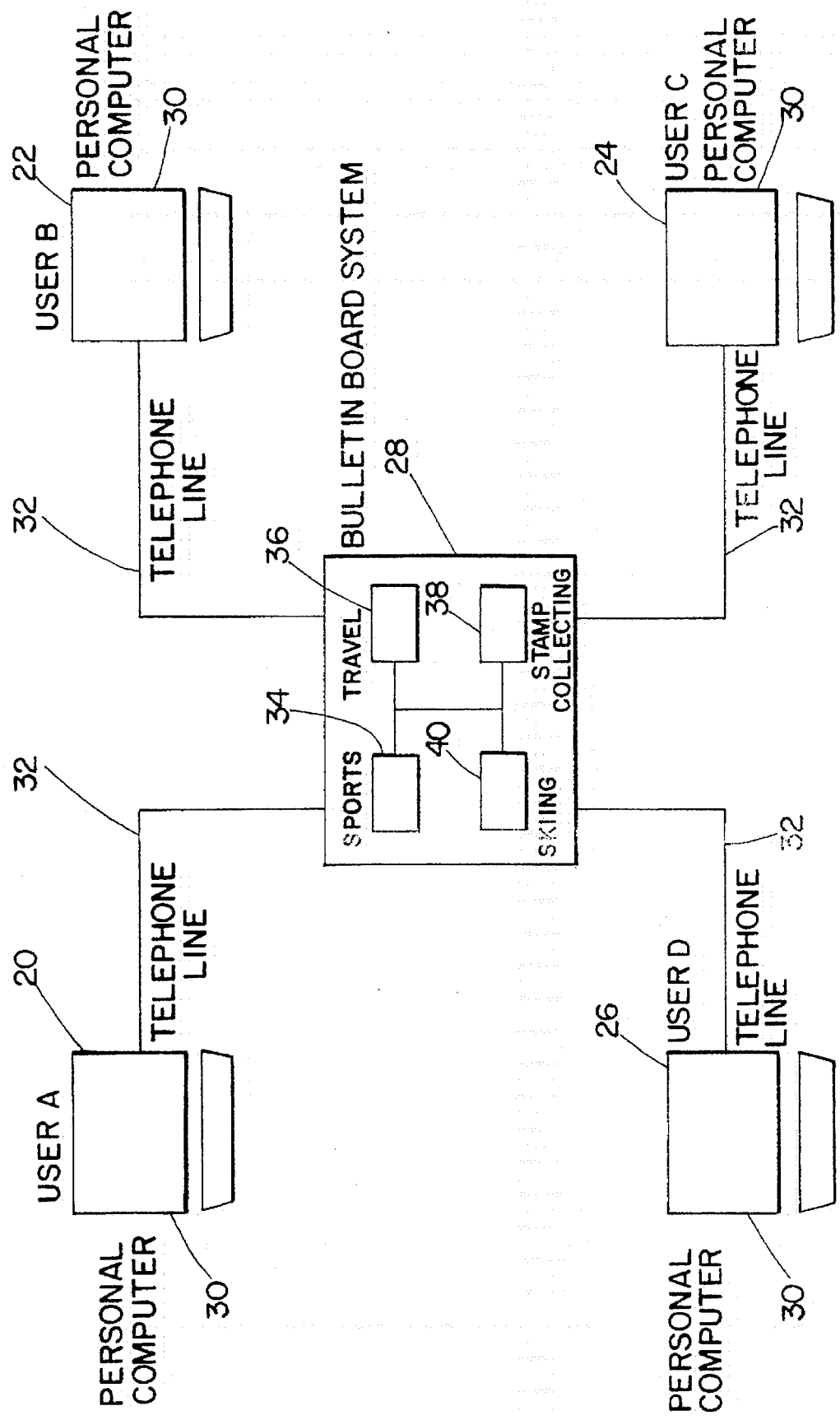
FIG. 1 illustrates a Bulletin Board System that is accessed by users that speak different languages.

Referring now to FIG. 1, a bulletin board system is shown. Users 20, 22, 24, 26 can access the bulletin board system 28 through a personal computer 30 and a modem. The users' personal computers are ordinarily connected to the bulletin board by telephone lines 32. The bulletin board system is subdivided by subject discussion areas; for example sports, travel, skiing, stamp collecting 34, 36, 38, 40 respectively. These discussion areas may be further broken down into several sections based on subject. For example, a sports discussion area may be separated into football, basketball, and baseball sections. Once a user obtains access to a particular bulletin board system, he or she may then log on to any of the discussion areas contained in the particular bulletin board system.

FIG. 2 illustrates the basic structure of parallel discussion groups. FIG. 2 illustrates a communication system which is comprised of three parallel discussion groups in English, French, and German, respectively shown at 42, 44, 46. The number of parallel discussion groups for a particular system varies with the number of languages it is designed to accommodate. For example, a parallel system designed to accommodate ten different languages will have ten parallel discussion groups; one for each language.

FIG. 2 illustrates one message structure of parallel discussion groups. Upon logging onto a discussion group, the user may choose his or her language preference. For example, a French user may log onto a discussion group and access the French version of the system. For example, FIG. 2 depicts the message structuring of a French version of a parallel discussion group. The message board section names and messages will be in French. Each of the messages translated from other language versions may also contain the text in the original language in addition to the French translation. If the French user posts a message to the parallel discussion group as shown in FIG. 2, it will be translated to English and German and posted to the English and German versions of the system.

The content, structure, and "thread" structure of the parallel discussion groups are preferably identical. When a message is posted and another user responds to it, a "thread" is created. A thread is a string of two or more related messages that are grouped together and preserve the original subject heading. For example, a French reply to an original English message is assigned properly to the English message. In a typical BBS, a user can display a hierarchical view of a thread to examine the history of the thread and the relationships between messages posted to that discussion group.

Figure 3:
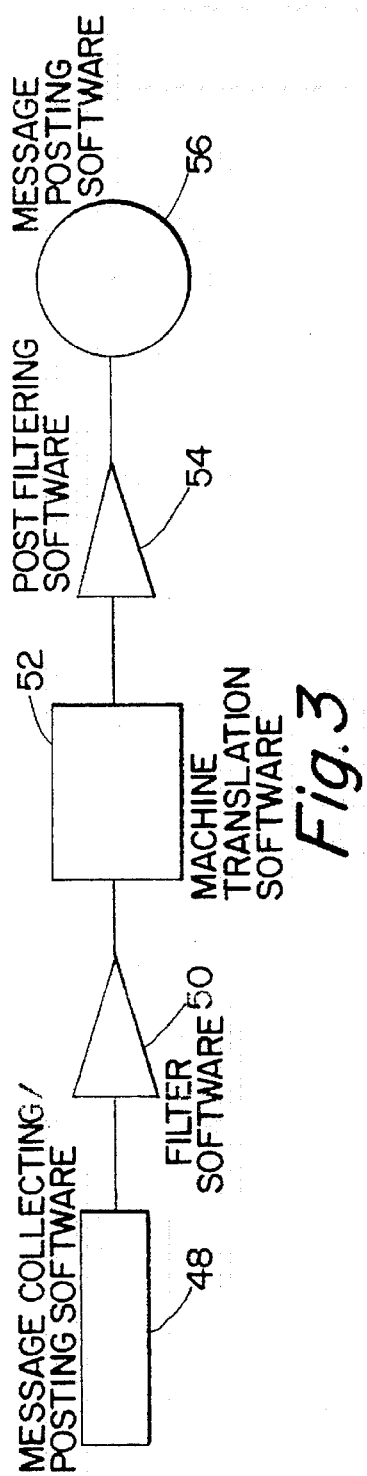
FIG. 3 illustrates the overall message translation process which may utilize the present invention.

FIG. 3 depicts the overall process steps involved in translating and posting a message from its original version to the other language discussion groups. Every message posted to a discussion group is preferably assigned a message identification number by the discussion group software. In one embodiment, the Message Collection/Posting Software 48 identifies new messages posted to a discussion group by comparing the message identification numbers to a continuously created database of old message identification numbers. New messages are collected on a periodic basis and submitted to one portion of the present invention that comprises filter software 50 for preprocessing of the message text before submitting it to the MT Software 52.

The present invention may identify and mark strings in the message text which are best left untranslated; such as, personal names, company and product names, quoted text, file and path names, commands, and samples of source code. These strings may then be linked to a preceding hookword. Hookwords may be automatically inserted then deleted in post-processing 54. Hookwords may be contained in the Intergraph dictionaries with part-of-speech and grammatical features which affect rearrangement of the nontranslated word in the target language. Once translated, the message is delivered to the target discussion group 56 in the language of that discussion group.

In the preferred embodiment, direct translation of the message text is performed (e.g. direct French to English translation). The MT Software may analyze and tags the sentences of the message text using linguistic algorithms. The words in the sentences may then be looked up in electronic dictionaries to identify their translations. The translated words may then be reordered and inflected according to the rules of the target language. Machine translation software has been developed by the Intergraph Corporation and is commercially available. Customized dictionaries containing computer specific terminology were developed by CompuServe Incorporated.

Once the translation process is complete, the translations may then be collected and posted to the target language discussion group at the same location within the message structure. This may be accomplished by the Message Collection/Posting Software.

The following example will serve to provide a more detailed description of the present invention. It must be stressed that the following is only an example implementation of the invention and is not intended to limit the scope of the invention to the specific features described in the example.

EXAMPLE

Figure 4:
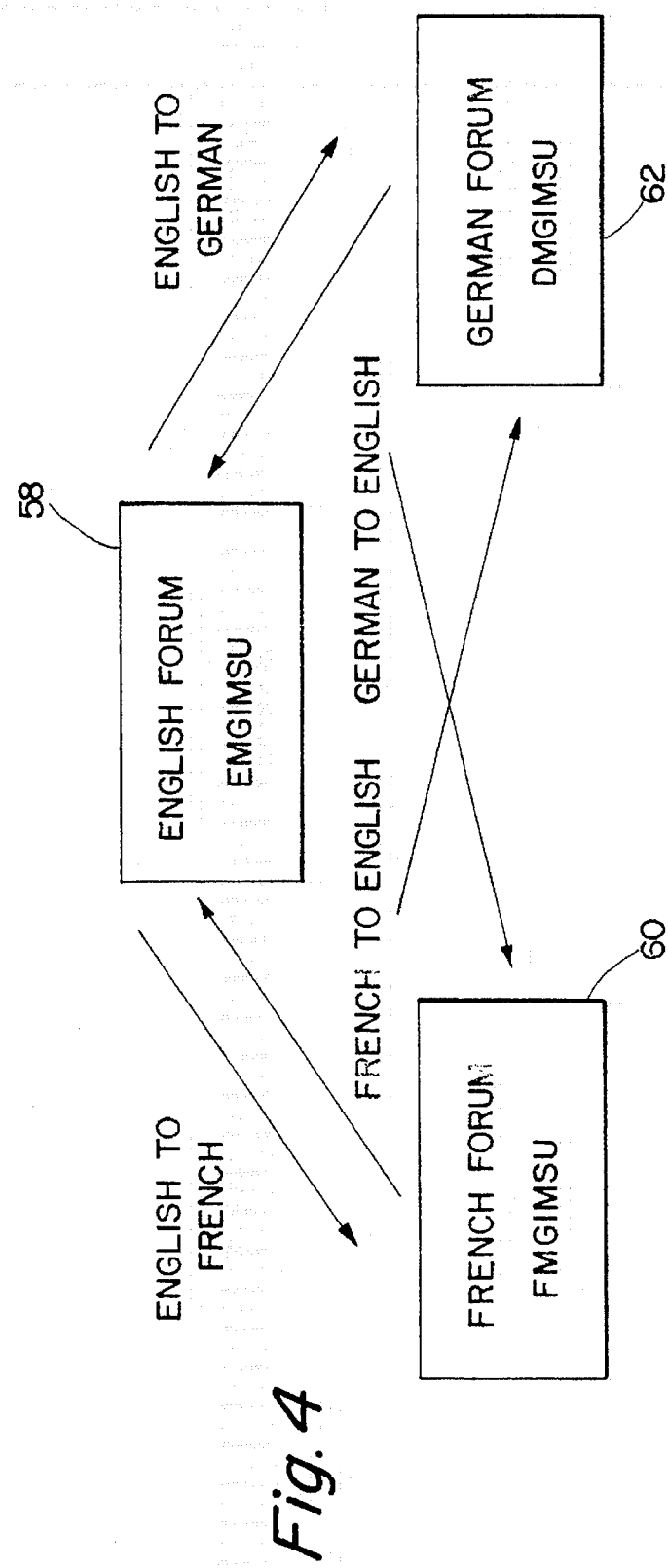
FIG. 4 is a diagrammatic view of an example of multiple language communication over parallel discussion groups.

The MacCIM™ Forum® discussion group is one of the most popular and widely-used groups on the CompuServe® Network, especially in Europe. New and experienced CompuServe® Information Service ("CIS") users access MacCIM™ to learn how to use the service, to enhance their access to the CIS Network, and to offer suggestions for improving MacCIM®. French and German users frequently log on to this discussion group, but until recently only minimal support was available to them in their native languages. Refer to FIG. 4 for a high-level overview of this structure, known as the MT Model.

The MT Model has three views that are each separate CompuServe® discussion groups—one in English (EMCIMSU) 58, one in French (FMCIMSU) 60, and one in German (DMCIMSU) 62. A user may only see one view at a time. All three discussion groups contain the same message content and configuration. In this Example, the following translation directions occur: English to French; English to German; French to English; and German to English.

In all three discussion groups, the message board section names appear in the native language. Messages in each section appear in the native language or are translated from another language. All of the discussion groups in this embodiment have an MT Comments section that is designated for any issues relating to machine translation. When a user posts a message on any one of the three discussion groups, the message translation process performs the translations and posts the translated messages onto the other two discussion groups. Messages translated from another language preferably contain the translation as well as the message as it originally appeared.

There are at least two ways a user can access the discussion groups. The first is to type GO MACCIM from the CompuServe® menu. The discussion group appears in the language that is defined in the user's language preference setting. A user whose language preference is set to English views EMCIMSU. A user whose language preference is set to French views FMCIMSU. A user whose language preference is set to German views DMCIMSU.

The second way to access any of these discussion groups is by typing GO plus any one of the three translation discussion group names. For example, if a French user types GO EMCIMSU, the English translation discussion group would display even though the user's language preference is set to French. This French user would still be able to view and post messages in this discussion group.

Figure 5:
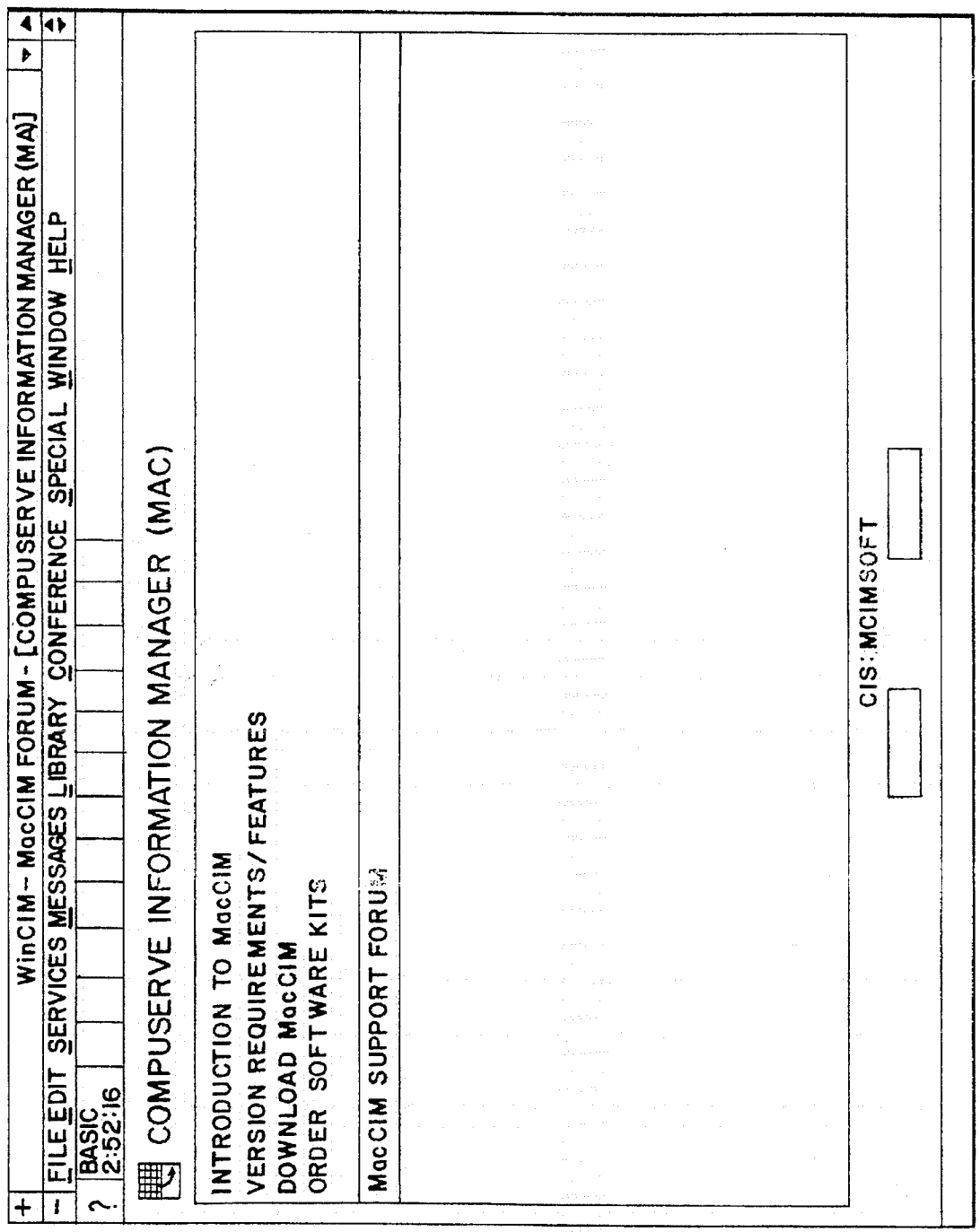
FIG. 5 is an example of a user's computer screen display while accessing the present invention through CompuServe.
Figure 6:
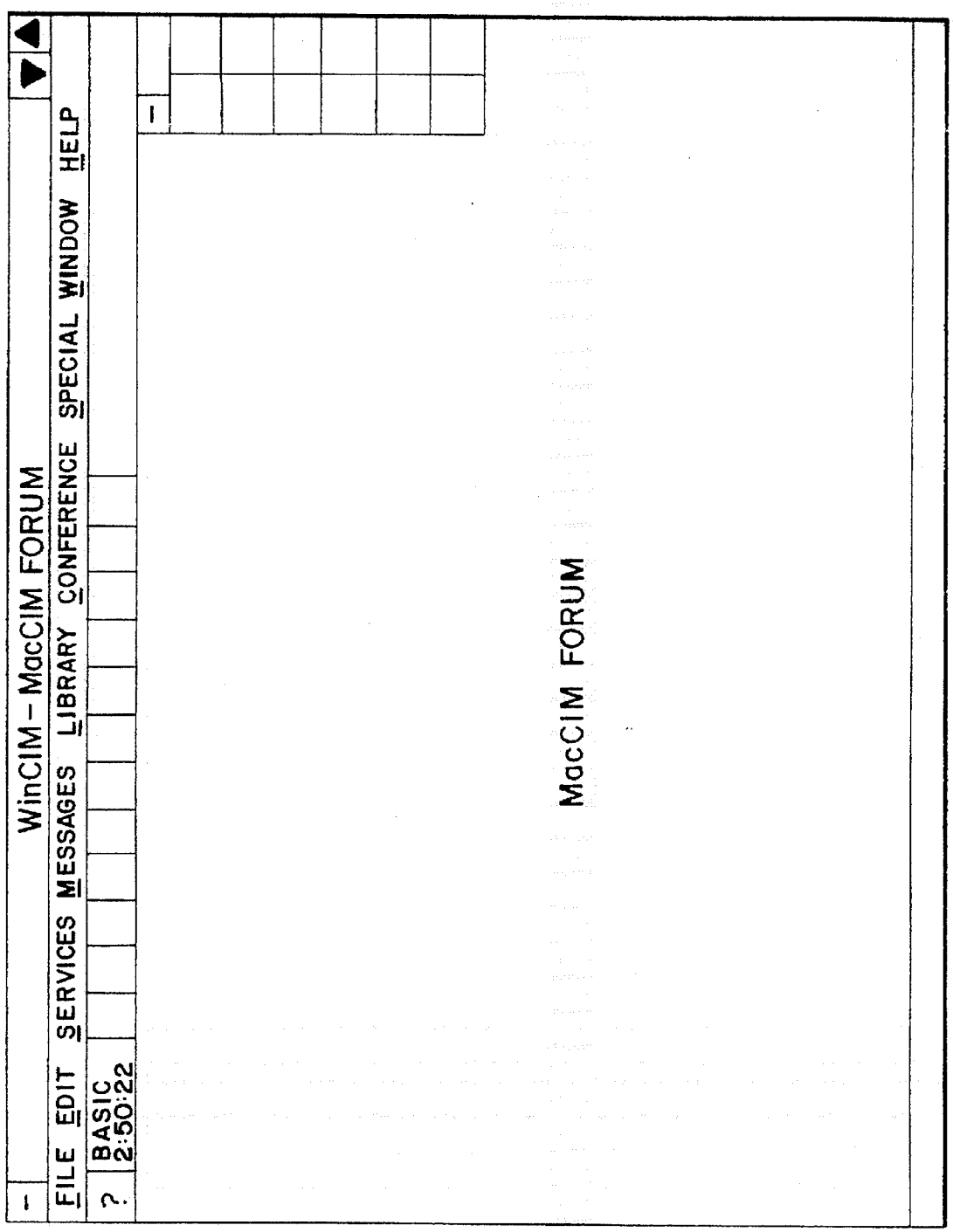
FIG. 6 is an example of a screen display of a user entering a particular discussion group.

An English-speaking user logs on to MacCIM™ to view new messages. Because she typed GO MACCIM and because her language preference in her CompuServe profile is set to English, the system navigates her to EMCIMSU. She sees a screen similar to that shown in FIG. 5. When the user selects the MacCIM™ Forum® discussion group, the screen displays as shown in FIG. 6. Next she selects the Messages icon to display the message board. As shown in FIG. 7, the user selects new messages in the MT Comments section, which refers to issues relating to machine translation. She notices she has two messages in this section.

Figure 8:
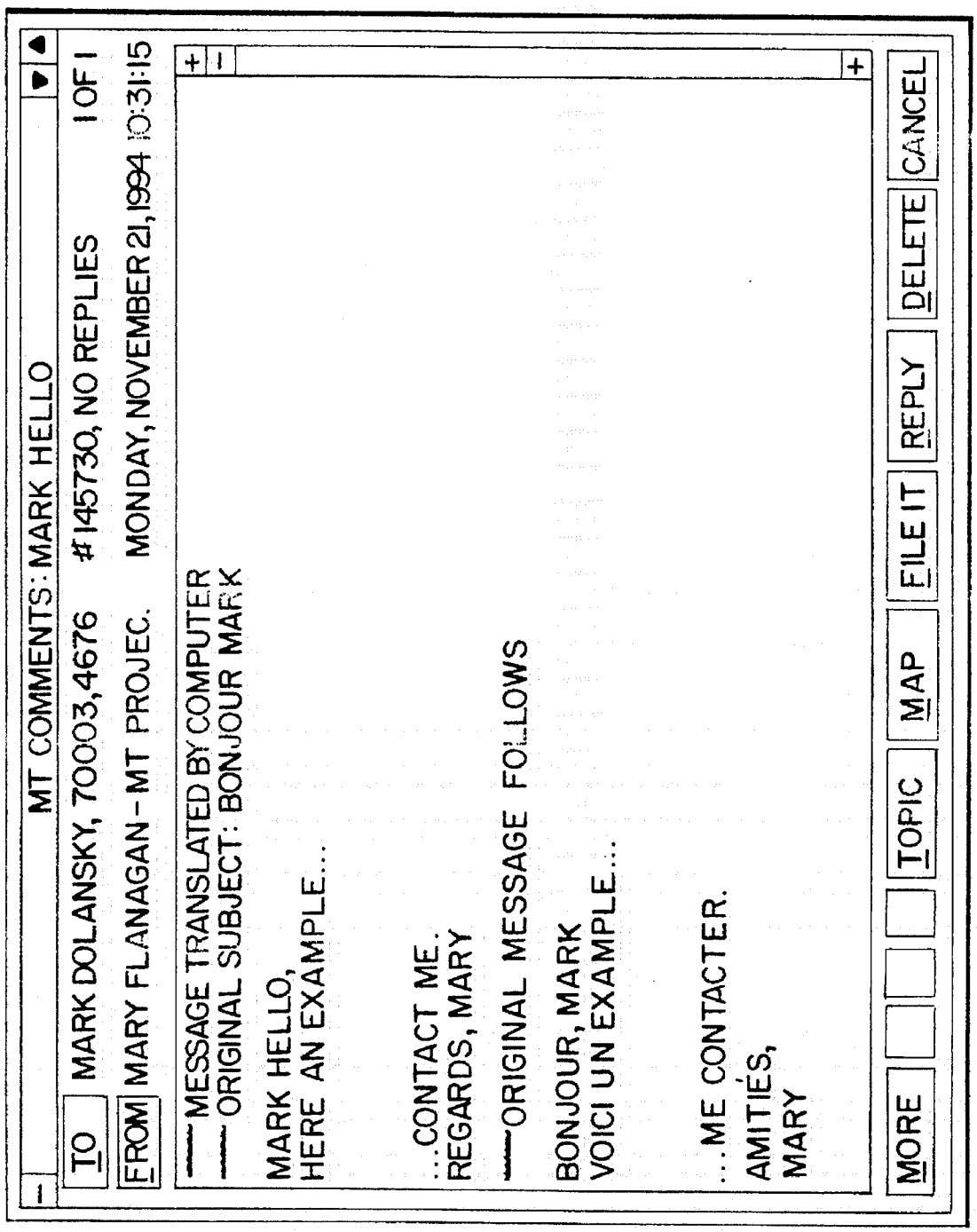
FIG. 8 is an example of a screen display of an original language message and a parallel foreign language translation message.
Figure 9:
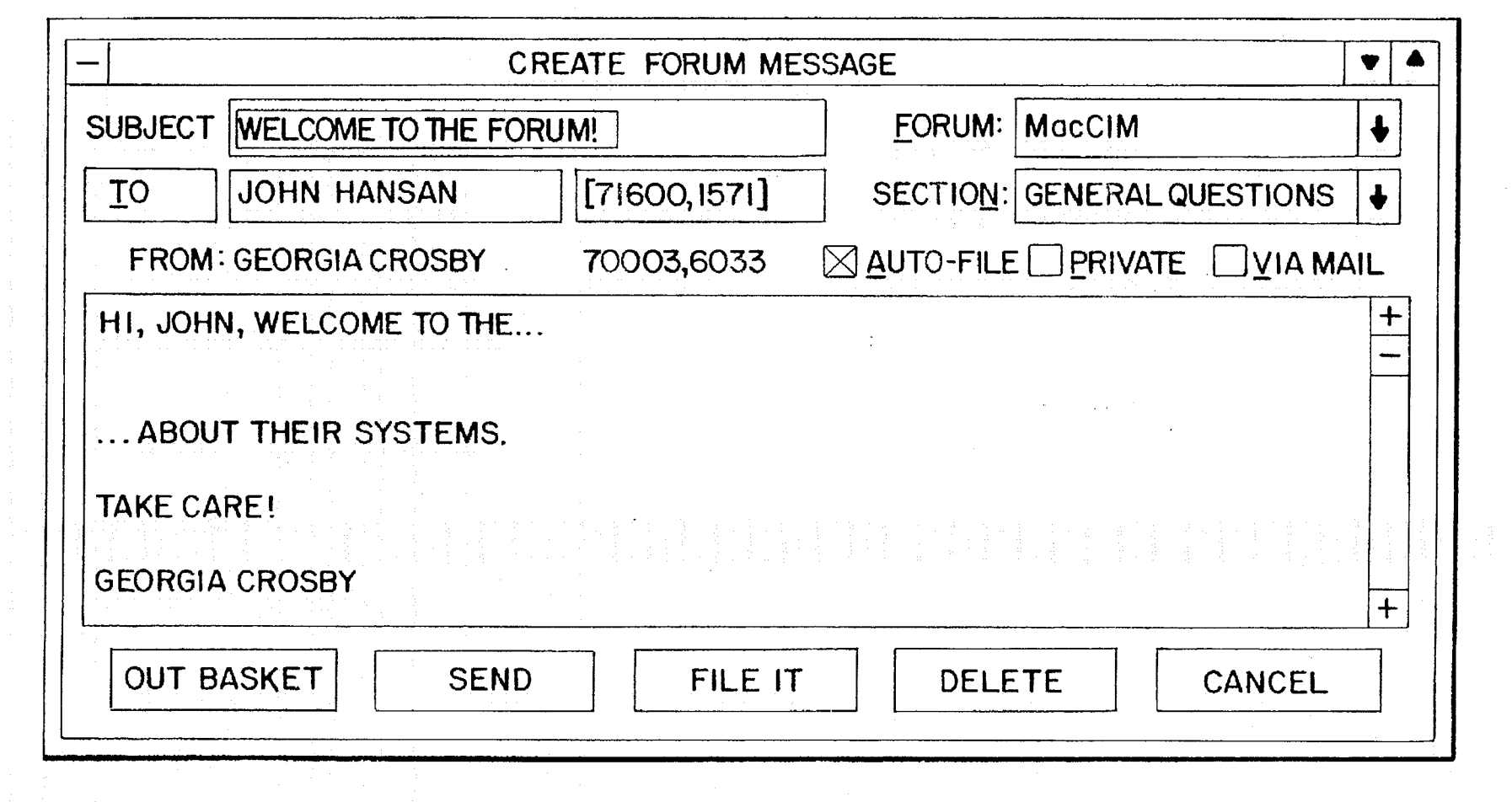
Figure 10:
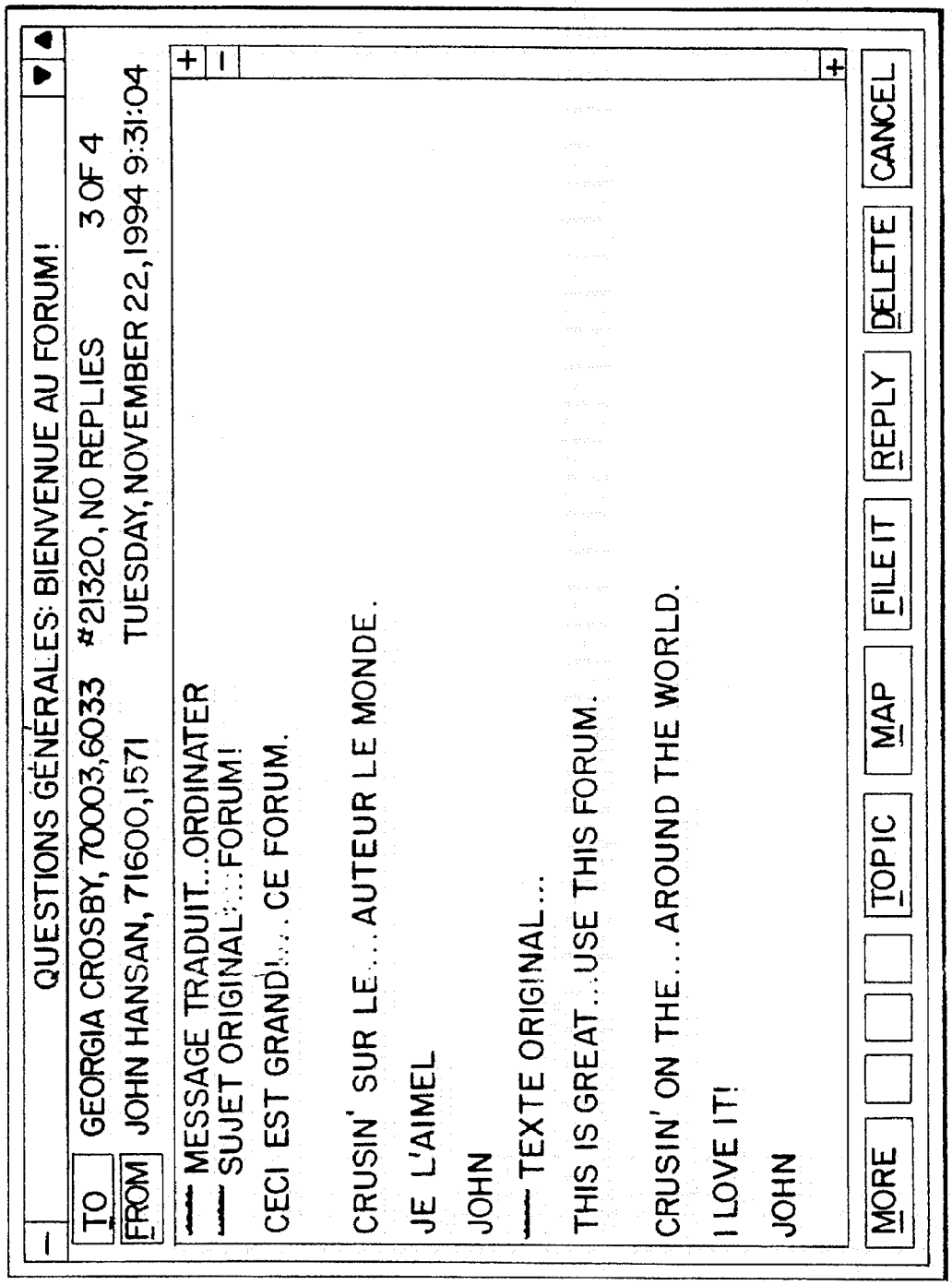
FIG. 10 is an example of a screen display for a user responding to the original message shown in FIG. 9.

The user reads a message translated from French to English as shown in FIG. 8. In this embodiment, the message includes both the translation and the text as it was originally written in French. During a MacCIM™ session, the English-speaking user decides to post a message to a person who she knows has recently joined the MacCIM™ Forum®. She posts the message to the General Questions section as shown in FIG. 9. Later she logs off. Because this user is also fluent in French, she decides to bypass the English version of the MacCIM™ Forum® and go directly to the French version to view any responses to her message. She finds she has received one response as shown in FIG. 10.

The user may still view any responses to her message by staying on the English version of the discussion group because any French or German responses to her message would still be translated and posted there. The present invention does not require her to go to the French group to view French replies.

Continuing with this Example, certain terms are defined to facilitate an understanding of the invention. Each translated message has two banners: one that introduces the translated message and another that introduces the message as it appeared in its original language. DP/Translator is the Intergraph Corporation's natural language translation system used to perform the MT Model's language translation in this embodiment of the invention. Filtering refers to the process by which messages are prepared for translation by DP/Translator. A header is the CompuServe® message information that appears at the top of any standard message.

In this embodiment of the invention, message translation is a batch process that runs on a continuous basis. It is driven by a Unix Shell script tricycle, which calls all the necessary programs in the order they need to run. A language code is a one-letter code that refers to a language. For example, French is referred to as f. In the following detailed process descriptions, this is abbreviated as lang-code. A language pair is a two-letter code that refers to the two languages from and to which translation occurs. The first letter is the source language; the second is the target language. For example, in an English-to-German translation, the language pair is eg. In the detailed process descriptions, this is abbreviated as lang-pair. Post-filtering refers to the process by which messages are further prepared for the pre-posting process once they have been translated. A shell script is a Unix-based file that contains a list of Unix commands.

A Unix shell script tricycle runs at a predetermined interval (in one preferred embodiment this interval was set at one hour) to retrieve new messages that users post onto the discussion groups. It passes them through the translation process and posts them to all three parallel discussion groups, in this Example.

Figure 11:
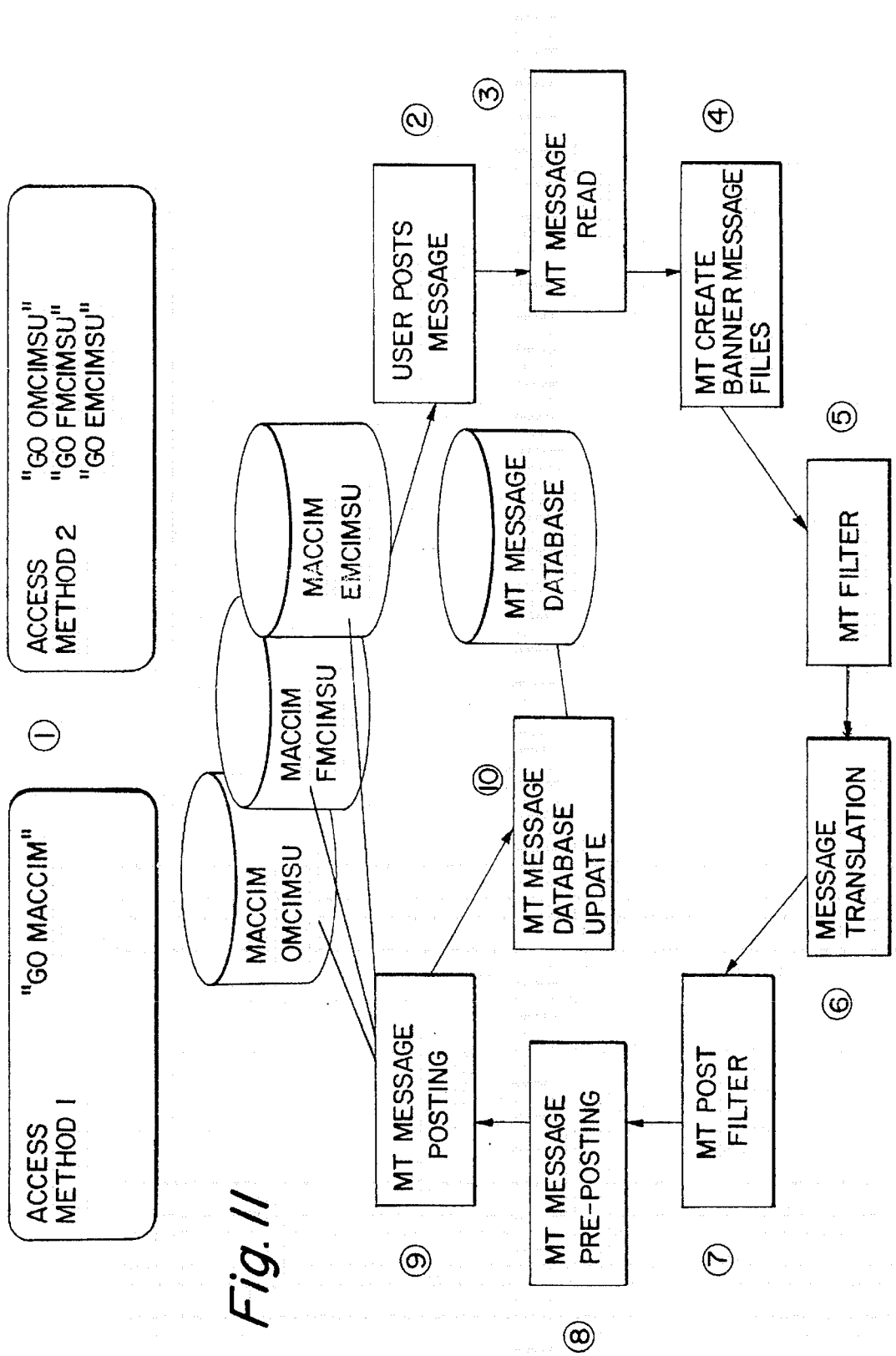
FIG. 11 is a diagrammatic view of a process which may utilize the present invention.
Figure 12:
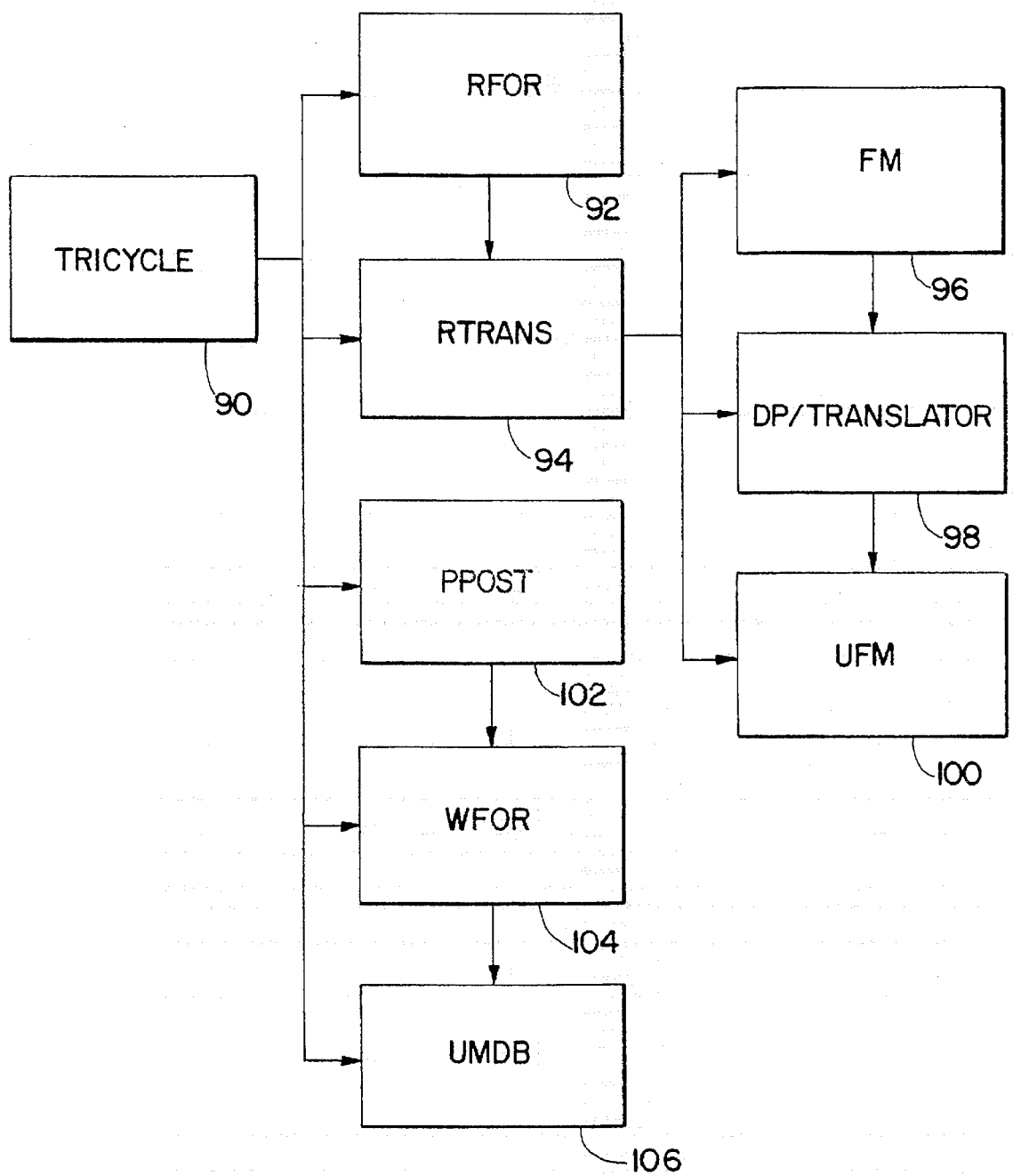
FIG. 12 is a flow chart of a machine translation software process flow.

Referring to FIGS. 11 and 12 a user posted message can originate from any of the three parallel discussion groups. The MT Message Read Process reads the message from the discussion group. A body text file is created as input to a filtering process. The message passes through the translation process. English is translated to French and German, German or French is translated to English.

The message is filtered again to remove the markers added during the MT Filter process for text that was not intended for translation. During translation, the original message text was saved in the originating language to be included with the translation. The translated message is further prepared for posting to the other two discussion groups. A posting output file is created that contains translated text, text in the originating language, and additional information required for posting.

MT Message Number Database Update adds a line of three message numbers (in this Example) to a database to maintain a cross reference of message identifiers among the three discussion groups. These include the message number that the source discussion group assigns to the message and the corresponding message numbers for the other two destination discussion groups.

The following introduces the software components of the MT process. The diagram in FIG. 12 shows the flow in which these components run.

| Name | Type | Description |
| --- | --- | --- |
| tricycle | Unix shell script | Orchestrates the hourly cycle of the MT process by calling each program in their appropriate order |
| rfor | C program | Reads messages from MacCIM discussion groups, determines whether they need to be translated, and creates a message header file and a message body text file; called by tricycle |
| rtrans | Unix shell script | Calls fm to filter the message file, DP/Translator to translate the messages, and ufm to perform post-translation filtering; called by tricycle |
| fm | C program | Identifies text that is not to be translated and surrounds with markers; called by rtrans |
| DP/Translator | Intergraph product | Performs message translation; called by rtrans |
| ufm | C program | Removes markers that surround text identified by fm as non-translatable; called by rtrans |
| ppost | C program | Creates a new file containing translated message to post to discussion groups; called by tricycle |
| wfor | C program | Posts messages to their corresponding discussion groups; called by tricycle |
| umdb | C program | Updates a message number database; called by tricycle |

The shell script tricycle governs sequencing of the MT process shown in greater detail in FIGS. 13A–13D. Preferably, on a continuous basis, it runs the MT programs in the appropriate order and for the correct number of times.

Figure 13A:
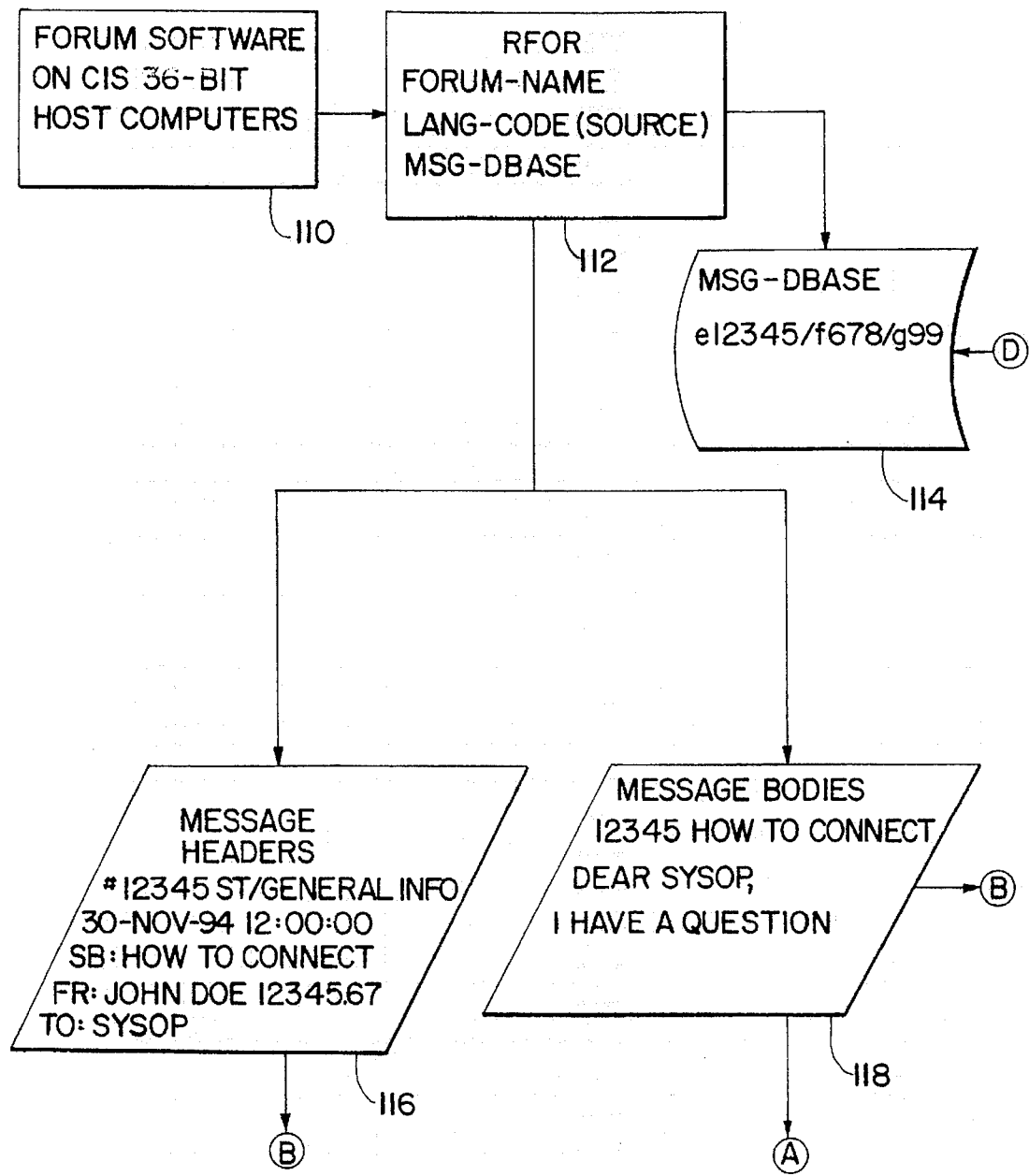
FIG. 13 A-D is a detailed flow diagram of the process shown in FIG. 12.

Referring to FIG. 13A, the tricycle script 110 does the following:
  (1) Sets some shell variables based on the current date and time; these are used to construct unique names for the temporary files that will be created;
  (2) Enters a request in the at queue to cause tricycle to be run again at half-past the next hour;
  (3) Backs up a message number database;
  (4) Calls the program rfor 112 for the English discussion group; rfor connects to CompuServe and reads new message headers to identify new messages to be translated;
  (5) Referring the FIG. 13B calls the shell script rtrans 120 for the English discussion group; rtrans runs the messages through a filter program fm 122 that identifies untranslatable message text, sends the message to DP/Translator 126 for translation, and routes the output from the translation to a post filtering program ufm 130;
  (6) Referring to FIG. 13C calls the program ppost 134 for the English discussion group; ppost creates the file to be posted to the discussion groups; this program is run twice, once to create the English-to-German translation file and another to create the English-to-French translation file;
  (7) Performs steps 3 through 5 for the French and German discussion groups, although it only runs rtrans once because translation only occurs for French to English and German to English;
  (8) Referring to FIG. 13D calls the program wfor 138 six times, once for each language pair (ef, eg, fe, fg, ge, gf), to post all translated messages to their appropriate discussion groups 140; and,
  (9) Calls program umdb six times, once for each language pair (ef, eg, fe, fg, ge, gf), to update message number database.

Referring again to FIG. 13A, the program rfor reads messages from the discussion group, checks to make sure they are not machine translated, and prepares them for filtering. The shell script tricycle calls rfor and provides it with the necessary parameters.

The program rfor 112 does the following:
  (1) Connects to CompuServe®;
  (2) Reads new message headers from the discussion group;
  (3) Compares the message numbers in the headers against those listed in a message number database 114 to determine whether the message is a machine-translated message from another discussion group; if so, it skips the message and goes to the next one;
  (4) Creates a message header file 116 that contains the message number, a date and time stamp, subject, sender, and recipient information; and
  (5) Creates a message body text file 118 that contains the message number, subject, and message text.

The following parameters are specified:

| | |
| --- | --- |
| discussion group-name | name of discussion group from which message originated (emcimsu, fmcimsu, dmcimsu) |
| lang-code | one-letter code (e, f, or g) specifying the source language specified in the CompuServe user profile |
| msg-dbase | name of the Unix database that holds a cross reference of all message numbers for each discussion group |
| hdr-file | name of the header file created as output |
| msg-file | name of the message file created as output |

As shown in FIG. 13A, inputs to rfor are discussion group-name, lang-code, and msg-dbase provided by tricycle. Outputs from rfor include hdr-file that is input to the MT Pre-Posting Process, and msg-file that is the input to the MT Filter Process.

Figure 13B:
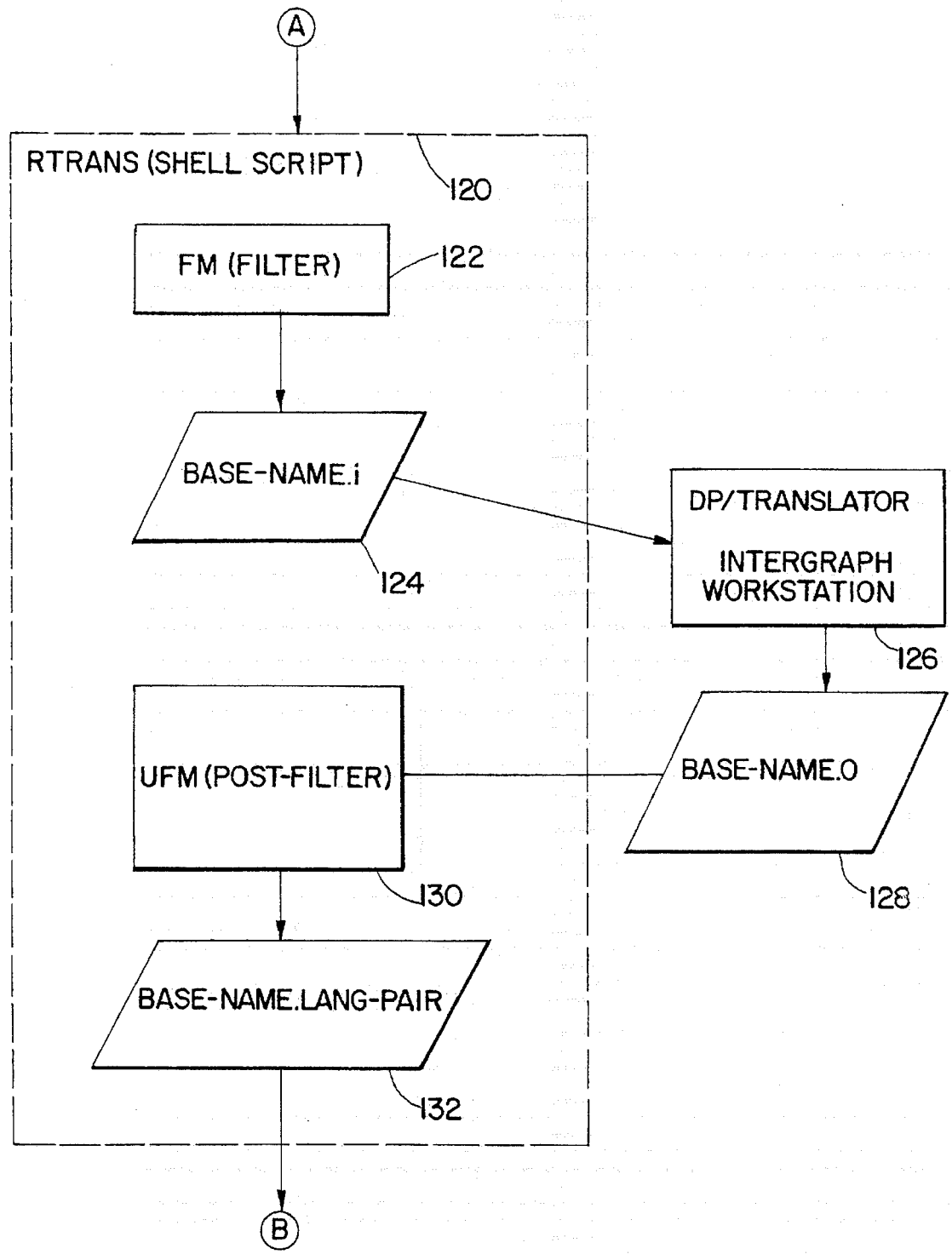

Referring to FIG. 13B, the shell script rtrans 120 calls the programs that filter, translate, and refilter the messages to be translated. The shell script tricycle calls rtrans.

The program rtrans 120 does the following:
  (1) Takes as input from tricycle the base name (referred to as base-name in some of the program descriptions that follow), the source language code, and the target language code;
  (2) If the source language code is g for German, then calls the filter program fm 122 with a special -g parameter that handles capitalization grammar rules specific to the German language;
  (3) If the source language code is f or e, calls filter program fm 122 without special capitalization rules;
  (4) Calls DP/Translator 126, providing it with the output file from fm 122 and additional parameters; and,
  (5) Retrieves the output and passes it through the post filter program ufm 130.

The program fm 122 runs the message file created during the MT Message Read Process through a filtering process to prepare the message text for translation. The shell script rtrans 120 runs the program and provides it with the necessary parameters. Then it submits the filtered output file as input to the translation program DP/Translator 126.

The program fm does the following:
(1) Evaluates text for strings that should not be translated;
(2) Places marks around the identified strings; and,
(3) If the source language is German, performs special filtering to handle nouns that are always capitalized.

When it runs fm, rtrans redirects input from the file base-name. source-lang. When it runs fm, rtrans directs output to a target file name called base-name 124.

The program ufm 130 runs the file generated from the language translation process DP/Translator 126 through a process that removes markers surrounding text strings that were not translated 120. The shell script rtrans runs the program and provides it with the necessary parameters.

When it runs ufm 120, rtrans 120 redirects input from the file base name.o128, which is an output file generated by DP/Translator 126 during the translation process. When it runs ufm 130, rtrans 120 directs output to a target file base-name.target-lang 132, where target-lang is the one-character language code (e, f, g) of the language to which the message was translated.

Figure 13C:
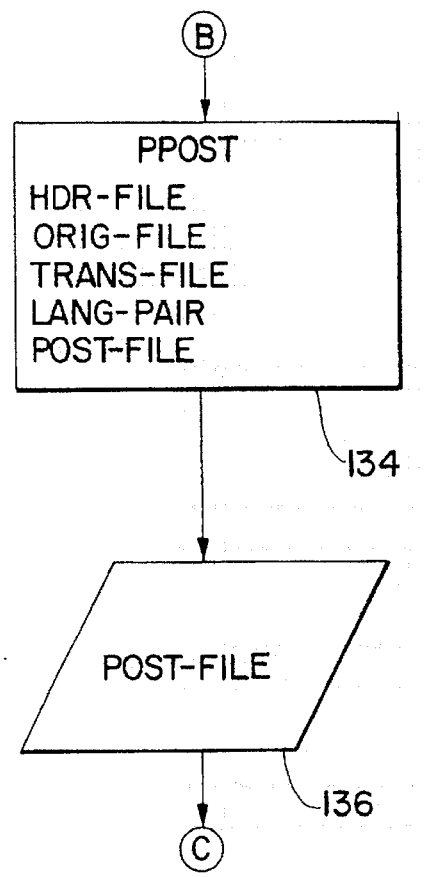

Referring to FIG. 13C, the program ppost 134 creates a new file to post to the discussion groups. The shell script tricycle calls the program six times, once for each source-target language translation pair (ef, eg, fe, fg, ge, gf). The header and message files may contain more than one message per run of ppost 134.

The program ppost does the following:
(1) Retrieves the header file created during the MT Message Read process;
(2) Retrieves the original message text written in the source language;
(3) Retrieves the translated message text;
(4) Determines the translation direction; and,
(5) Creates an output file 136 that contains the entire translation message. The following parameters to program ppost 134 are specified:

| | |
|---|---|
| hdr-file | header file created during the MT Message Read Process |
| orig-file | message in its original form, created during the MT Message Read Process |
| trans-file | translated message file |
| lang-pair | two-character code identifying the source-target language translation pair |
| post-file | file containing entire message to be posted onto the target discussion group |

Inputs to ppost 134 include the header file from the MT Message Read Process (base-name.hdr), the original text file from the MT Message Read Process and, the source-target language pair. The posting files that ppost 134 creates contain: the original message number; the parent message number if this is a reply; sender, recipient and (translated) subject information; a banner that identifies the message to follow as translated text and displays the original subject; the translated text; a banner that identifies the message to follow as the original text; and, the original text.

Figure 13D:
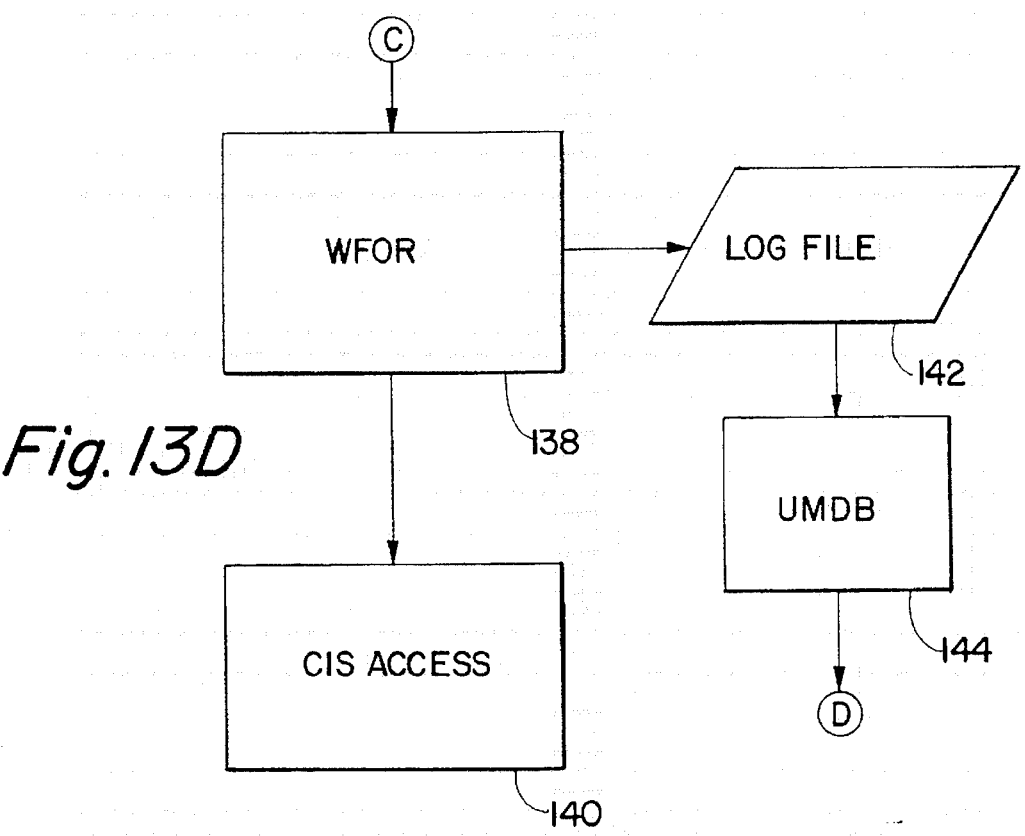

Referring to FIG. 13D the program wfor 138 accesses CompuServe® 140 and posts translated messages to their corresponding CompuServe® Forum® discussion groups. The shell script tricycle calls the program six times, once for each source-target language translation pair (ef, eg, fe, fg, ge, gf).

The program wfor 138 does the following:
(1) Accesses the appropriate CompuServe® discussion group;
(2) Posts the message files created during the MT Pre-Posting Process; and,
(3) Appends message and message number information to a log file that is later used to update the message number database.

The following parameters are specified:

| | |
|---|---|
| discussion group-name | name of destination discussion group |
| post-file | name of the file created during the MT Pre-Posting Process |
| lang-pair | two-character code identifying the source-target language translation pair |
| msg-dbase | name of the Unix database that holds a cross reference of all message numbers for each discussion group |
| log-file | file to which message numbers are appended and from which the cross reference of message numbers are updated |

Inputs to wfor 138 include discussion group-name, post-file, lang-pair, and msg-dbase provided by tricycle. The outputs of wfor include the updated discussion groups and six message database log files, one for each language pair.

The program umdb 144 updates the message number database with the message IDs assigned to each message on a discussion group. The shell script tricycle calls umdb six times, once for each source-target language translation pair (ef, eg, fe, fg, ge, gf).

Umdb 144 does the following:
(1) Opens the message database; and,
(2) Loads the message data into the database.

The following parameters are specified:

| | |
|---|---|
| log-file | file to which message numbers are appended and from which the message number database is updated. |
| lang-pair | two-character code identifying the source-target language translation pair. |
| msg-dbase | name of the Unix database that holds a cross reference of all message numbers for each discussion group. |

Inputs to umdb 144 include log-file, lang-pair, and msg-dbase provided by tricycle. The output of umdb 144 is the updated database.

END OF EXAMPLE

What is claimed is:

1. A method for electronically translating text, comprising the steps of:
pre-processing said text with a software filter to identify a text string within said text to remain untranslated;
placing a machine readable mark in association with said text string;
submitting said text to an electronic and automatic language translator, whereby said language translator translates said text into a different language in accordance with a machine translation dictionary while leaving said text string untranslated; and
receiving said translated text and said untranslated text string, electronically and automatically from the language translator.

2. A method for electronically translating text, comprising the steps of:
identifying a text string included within an electronic discussion group to remain untranslated;

providing a machine readable mark onto said text string;

submitting said text to an electronic, automatic language translator, whereby said language translator translates said text into a different language while leaving said identified text string untranslated;

receiving translated text from the language translator; and electronically and automatically deleting said mark from said text string.

* * * * *

UNITED STATES PATENT AND TRADEMARK OFFICE
CERTIFICATE OF CORRECTION

PATENT NO. : 5,715,466

DATED : February 3, 1998

INVENTOR(S) : Mary A. Flanagan, Alexander B. Trevor and Philip Jensen

It is certified that error appears in the above-identified patent and that said Letters Patent is hereby corrected as shown below:

In column 7, line 49, please delete the letters "nm" and replace it with -- run --.

In column 7, line 60, please delete the word "fxom" and replace it with -- from --.

In column 9, line 12, please delete the word "base-name" and replace it with -- base-name.i --.

In column 9, line 19, please insert a space before "128" and delete the space after "128".

Signed and Sealed this

Second Day of June, 1998

BRUCE LEHMAN

Attest:

Attesting Officer

Commissioner of Patents and Trademarks